United States Patent [19]

Kool et al.

[11] Patent Number: 4,569,766

[45] Date of Patent: Feb. 11, 1986

[54] HYDROGEN SULFIDE AND MERCAPTAN SCAVENGER

[75] Inventors: Eric T. Kool, Cleveland; Curtis E. Uebele, Bedford, both of Ohio

[73] Assignee: The Standard Oil Company, Cleveland, Ohio

[21] Appl. No.: 617,761

[22] Filed: Jun. 6, 1984

[51] Int. Cl.$^4$ .......................... B01D 15/00; C02F 1/54
[52] U.S. Cl. ........................................ 210/690; 55/73; 55/74; 134/6; 134/42; 210/660; 210/691; 210/729; 210/908

[58] Field of Search ...................... 55/73, 74; 210/660, 210/690, 691, 729, 908; 134/6, 7, 42

[56] References Cited

U.S. PATENT DOCUMENTS 4,450,777  5/1984  Wolfrum et al. ................... 210/660

*Primary Examiner*—Ivars Cintins
*Attorney, Agent, or Firm*—Larry W. Evans; David J. Untener; William A. Heidrich

[57] ABSTRACT

Hydrogen sulfide and mercaptans are scavenged from materials, especially fluids, by contacting the fluids with maleimides.

18 Claims, No Drawings

HYDROGEN SULFIDE AND MERCAPTAN SCAVENGER

BACKGROUND OF THE INVENTION

This invention relates to a process for scavenging hydrogen sulfide and mercaptans from materials, particularly fluids, by contacting the materials containing the sulfur compounds with maleimides.

The reactivity of olefins with sulfur compounds is known in the art. Ger. Offen. No. 2,710,529 discloses the reaction of acrylamide with hydrogen sulfide in the presence of aqueous base to produce 3,3'-thio-di-propionamide. The reaction of sulfur compounds with α,β-unsaturated anhydrides to produce the corresponding substituted mercaptan anhydrides is disclosed in B. C. Trevodi and B. M. Culbertson, Maleic Anhydride, 1982; and F. B. Zienty, B. D. Vineyard and A. A. Schleppnik, Journal of Organic Chemistry, 1962, p. 3140. However, these processes generally require the addition of an alkaline catalyst. The biological action of maleimide is known as disclosed in Biokhimiya, 1975, 40 (3), 489–496. Maleimide has been shown to be an effective -SH blocking reagent which can inhibit many enzymes whose active site utilizes an -SH group.

Hydrogen sulfide and mercaptans, particularly the lower carbon mercaptans, when present in a variety of commercial or industrial system materials are known to have undesirable effects, for example, they can be toxic, odoriforous and corrosive. Therefore, it is desirable to have a simple process for the removal of these noxious substances from these materials.

U.S. Pat. No. 4,374,732 discloses the removal of organo-sulfur impurities from organic or aqueous solutions by contacting said solutions with polymers containing functional groups consisting of metal salts of N-halosulfonamides. However it is desirable that the reactive polymer be insoluble in the fluid media to be purified in the practice of that process.

In the process of this invention, it has been found that hydrogen sulfide and mercaptans can be removed from materials, particularly fluids, containing them by simply contacting such fluids with the maleimides without requiring insolubility of the maleimide in the fluid media to be purified. Maleimides are not only useful in aqueous and aqueous/organic solutions, but can easily be utilized in the solid and gaseous state. Moreover, since the reaction of maleimide with these sulfur compounds occurs in the presence of a wide pH range including acidic, neutral and basic solutions, the process of this invention does not require alkaline catalysts as has been known in the art for the reaction of olefins, other than maleimide, with hydrogen sulfide and mercaptans.

SUMMARY OF THE INVENTION

In accordance with the present invention, a process has been found that scavenges hydrogen sulfide ($H_2S$) and mercaptans from materials simply by contacting the substances with maleimide or its derivatives. Maleimides are effective for scavenging these sulfur compounds from fluids in particular in a wide range of pH and $S^=$ and -SH concentrations. The process does not require additives, particularly alkaline catalysts, and conventional contacting procedures can be utilized.

DESCRIPTION OF THE PREFERRED EMBODIMENT

This invention provides a process for scavenging hydrogen sulfide and mercaptans from materials, the process comprising contacting a material containing hydrogen sulfide and mercaptans with maleimides. Due to the reactivity of maleimides with -SH groups, maleimides have been found to be very effective for scavenging hydrogen sulfide and mercaptans from materials, particularly fluids, in the process of this invention. Mercaptans and hydrogen sulfide are nucleophilic sulfur compounds which are believed to react with the electron-poor double bond of maleimide,

and its derivatives, so as to form maleimide adducts. Consequently, the reaction of maleimides with hydrogen sulfide and mercaptans makes the $H_2S$ or mercaptan innocuous and removes these undesirable substances from the environment. For example, as shown in reaction I below, the reaction of maleimide (1) with $H_2S$ is believed to produce a monoadduct mercaptan (2) which in turn is believed to react with maleimide to form a double-addition product bis-thioether (3).

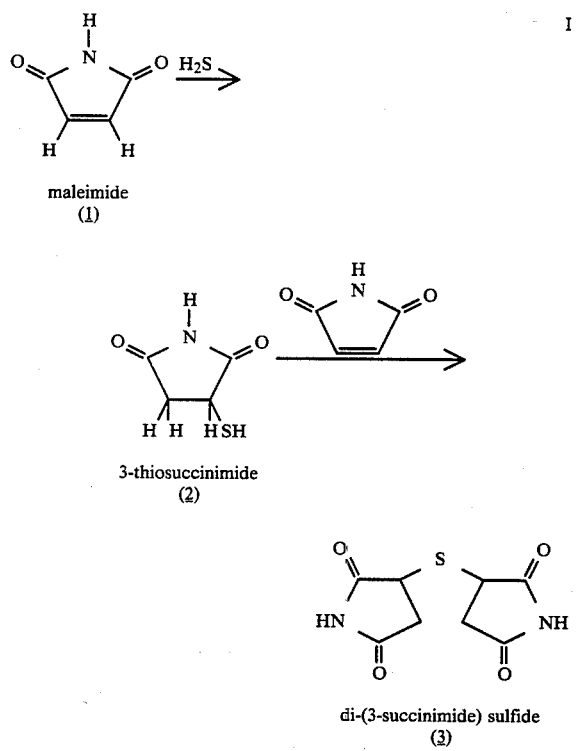

Maleimide derivatives are believed to react in the same way as shown in reaction I above. Suitable maleimide derivatives useful in the present invention include 3,4-carbon-substituted and N-substituted maleimide derivatives. The 3,4-carbon-substituted maleimide derivatives have the general formula:

wherein X and X' may be H, F, Cl, Br, I —CH$_3$, —C$_2$H$_5$, —OH or —CN. The N-substituted maleimide derivatives have the general formula:

$$>N-R$$

wherein R is one of hydrogen (H); hydroxyl (—OH); a halogen; a cyanogen (CN) group; an ether, an ester, a ketone or an aldehyde group; or a hydrocarbon group including a paraffin, olefin or aromatic group.

In addition to removing hydrogen sulfide from a fluid, maleimide and its derivatives react with mercaptans so as to effectively remove mercaptans from a system. The process is applicable to the removal of mercaptans having the following formula:

$$R-SH$$

wherein R is a hydrocarbon group having from 1 to 40 carbon atoms and preferably from 1 to 20 carbon atoms. Most preferred is a hydrocarbon group having from 1 to 6 carbon atoms because these mercaptans are most desirable for removal due to their noxious and corrosive nature.

An advantage of this process is that it may be carried out in an environment where the pH is either acidic, neutral or basic. The process is especially effective in acidic environments and is particularly advantageous for several possible unique applications, including reducing the corrosivity of sour crude oil/water mixtures, deodorizing aqueous solutions, lowering the corrosivity and toxicity of industrial waste streams, and minimizing the detrimental environmental impact of H$_2$S generating bacteria.

For the reaction to proceed, one molecule of maleimide is necessary for every proton present on the sulfur atom. Consequently, a molar ratio of maleimide to hydrogen sulfide of 2:1 and a 1:1 ratio of maleimide to mercaptan is required for complete reaction. To be more efficient, it is desirous to have 2 moles of maleimide present for each proton bound to the sulfur on the compound being scavenged. Since increasing the molar ratio shortens the time required to absorb the H$_2$S or mercaptan, a more concentrated use of maleimide is necessary in situations where more rapid reaction kinetics are desired.

Reaction kinetics are rapid at ambient conditions of temperature and pressure and no additives are necessary for the reaction to proceed. Alterations of these reaction parameters, particularly temperature, are expected to alter reaction kinetics accordingly. A solid at room temperature, pure, concentrated maleimide has a tendency to polymerize at or near its melting point and become less reactive. Beyond temperatures of 400° C., maleimide is expected to be unstable. In order to avoid polymerization and thermal decomposition of solid, concentrated maleimide, it is desirous to conduct the process in temperatures below 100° C. However, it is possible to achieve higher temperatures and avoid polymerization of solid maleimide if it is present in a more dilute form. Nevertheless, polymerization inhibition additives, such as radical chemical stabilizers, permit process operation at higher temperatures and concentrations. When maleimide is used in a vapor phase reaction, temperatures may range from ambient up to 400° C.

The process of this invention can be carried out using conventional contacting procedures. Generally, for industrial or commercial use, a reservoir of maleimide solution can be contacted with a stream containing H$_2$S or mercaptans for removal. Contact can occur in a variety of containers, such as a process or transport line, a separate stirred or non-stirred container or other vessels such as scrubbers or strippers. Maleimide is volatile, therefore it can be vaporized and introduced as a gas to be contacted with another fluid. Alternatively, solid or stabilized liquid maleimide can be sprayed or added into a system. It is also anticipated that a maleimide solution can be added via surface or down hole equipment or at any time in the process stream in recovering crude oil so as to remove the noxious quality and corrosive nature of the H$_2$S and mercaptans in the processing system.

For liquid systems, suitable solvents for dissolving maleimide include polar and non-polar solvents such as water, acidified water, alcohols, esters, benzene and benzene derivates. The preferred solvents include water, acidified water, ethyl acetate, acetone, benzene and toluene. An advantage of this invention is that maleimides are reactive with the -SH in both aqueous and aqueous/organic mixtures.

It is anticipated that maleimides are effective in scavenging H$_2$S and mercaptans from not only fluid systems, but from solid materials such as porous rock, as well.

Although the invention has been described in terms of a specific embodiment of a manner in which the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

SPECIFIC EMBODIMENTS

EXAMPLE 1

A flask was filled with deionized water (200 ml) and H$_2$S was bubbled through (250 ml/min) for a few minutes. To measure the hydrogen sulfide (H$_2$S) content of the solution, a sample (1 ml) was diluted to 100 ml and mixed (1:1) with sulfide anti-oxidant buffer (SAOB) which is available from Orion Research, Inc. in Cambridge, Mass. Measurements were made with an ion-specific electrode. H$_2$S was measured before ("0 min.") and after maleimide addition. In the first test (1), solid maleimide (1.94 g) was added with one minute swirling. In the second test (2), solid maleimide (1.94 g) was added without swirling and in the third test (3) maleimide (1.94 g) dissolved in water (20 ml) was added without swirling. Proton NMR, elemental analysis and mass spectrometry identified the product as nearly pure bis-thioether (3) as in the earlier reaction I and a small amount of mercaptan (2), also as in reaction I above. The following results were obtained as summarized in Table I:

TABLE I

The Reactivity of Maleimide with H₂S in Water
H₂S Concentration (ppm)

| Time (min.) | 1 maleimide (mixing) | 2 maleimide (no mixing) | 3 maleimide/water (no mixing) |
|---|---|---|---|
| 0 | 2400 | 2550 | 2450 |
| 5 | 1680 | 2380 | 1650 |
| 11 | 1460 | 2410 | 1280 |
| 16 | 1280 | 2330 | 1240 |
| 21 | 1450 | 2260 | 1220 |
| 30 | 1410 | 2360 | 1160 |

The above results show that at concentrations of approximately 0.02M in water, maleimide reacts fairly rapidly with H₂S. When solid maleimide is added, shaking increases its ability to react with H₂S.

EXAMPLE 2

Another experiment was conducted to test the effects of maleimide at low S= concentrations. A solution containing sulfide in water was prepared as in Example 1, except repeated dilutions were made. The first electrode reading was taken immediately after addition of the maleimide since the reaction was slower. In the first test, only water (30 ml) was added to the sulfide solution as a control. In the second test, a solution of maleimide (0.074 g) in water (30 ml) was added and in the third test, a less concentrated solution, maleimide (0.0194 g) in water (30 ml) was added. The following results were obtained:

TABLE II

The Reactivity of Maleimide with Low H₂S Concentration

| Time elapsed (min.) | H₂S Concentration (ppm) |
|---|---|
| Water only | |
| 0 | 15.8 |
| 9 | 16.6 |
| 30 | 15.7 |
| 45 | 15.9 |
| 90 | 15.5 |
| 1135 | 7.2 |
| Maleimide (0.074 g) | |
| 0 | 28.2 |
| 10 | 23.9 |
| 21 | 20.8 |
| 40 | 15.1 |
| 65 | 10.6 |
| 90 | 7.2 |
| 157 | 3.3 |
| 200 | 1.8 |
| Maleimide (0.0194 g) | |
| 0 | 13.8 |
| 7 | 14.2 |
| 13 | 13.9 |
| 20 | 15.2 |
| 30 | 13.8 |
| 88 | 10.9 |
| 230 | 5.9 |
| 323 | 5.3 |
| 430 | 3.6 |

The above results demonstrated the reactivity of small amounts of maleimide (0.00076 mol or 0.074 g maleimide in 30 ml water and 0.0002 mol or 0.0194 g maleimide in 30 ml water) with low sulfur concentrations.

EXAMPLE 3

The following experiments were conducted to test the scavenger ability of maleimide in produced water in various pH's. Produced water was a mixture of inorganic salts which duplicated oil field brines. In addition to a high concentration of divalent ions, such as $Mg^{++}$ and $Ca^{++}$, the produced water contained a total salinity of approximately 3.6 percent, which included 1.9 percent NaCl. Produced water (25 ml) was diluted with SAOB (25 ml) and 0.1 g of maleimide added to solutions whose pH was adjusted by using hydrogen chloride, sodium bicarbonate and sodium hydroxide. The following results were obtained as summarized in Table III:

TABLE III

Maleimide/H₂S Reaction in Produced Water and Varied pH

| pH | Time (min.) | H₂S (ppm) | Percent (Change) (Reduction) |
|---|---|---|---|
| 4 | 0 | 9.43 | — |
|   | 4 | 9.30 | 1.4 |
|   | 8 | 7.66 | 18.8 |
|   | 14 | 6.62 | 29.8 |
|   | 22 | 5.36 | 43.2 |
|   | 33 | 3.88 | 58.9 |
| 6 | 0 | 5.50 | — |
|   | 3 | 0.786 | 85.7 |
|   | 7 | 0.076 | 98.6 |
|   | 15 | 0 | 100 |
|   | 30 | 0 | 100 |
| 7.6 (unadjusted) | 0 | 3.520 | — |
|   | 3 | 0.207 | 94.1 |
|   | 7 | 0.049 | 98.6 |
|   | 15 | 0.017 | 99.5 |
|   | 24 | 0.0 | 100 |
|   | 33 | 0.0 | 100 |
| 8.0 | 0 | 0.61 | — |
|   | 4 | 0.0 | 100 |
|   | 25 | 0.0 | 100 |
| 10.1 | 0 | 2.150 | — |
|   | 3 | 0.348 | 83.8 |
|   | 7 | 0.062 | 97.1 |
|   | 15 | 0.019 | 99.1 |
|   | 30 | 0.0 | 100 |

The above results demonstrated the effectiveness of maleimide to scavenge H₂S from produced water in a variety of pH's.

EXAMPLE 4

This Experiment was conducted to test the reactivity of maleimide derivatives with hydrogen sulfide. Produced water (25 ml), as in Example 3 above, was diluted with SAOB (25 ml) and N-methylmaleimide (0.11 g), N-ethyl maleimide (0.13 g), N-phenylmaleimide (0.18 g) were added to make three separate solutions. The results are summarized in Table IV.

TABLE IV

Maleimide Derivatives and H₂S Reactivity

| Maleimide derivative | Time elapsed (min.) | H₂S Concentration (ppm) |
|---|---|---|
| N—methylmaleimide | 0 | 1.93 |
|   | 4 | 0.03 |
|   | 8 | 0.02 |
| N—ethylmaleimide | 0 | 2.15 |
|   | 3 | 0.03 |
|   | 7 | 0.00 |
| N—phenylmaleimide | 0 | 5.50 |
|   | 3 | 4.29 |
|   | 7 | 4.07 |

The above results demonstrated the ability of maleimide derivatives to scavenge H₂S from fluids.

EXAMPLE 5

This experiment was conducted to demonstrate the ability of maleimide to remove hydrogen sulfide from an oil/water mixture. Produced water (100 ml), as described in Example 3 above, and crude oil (100 ml) were added to a flask and $H_2S$ was bubbled through the mixture for approximately 30 minutes. An aliquot (1 ml) sample was taken from the water layer and diluted 100 times and added 1:1 to SAOB for each measurement. The concentration of $S^=$ was measured over time without the addition of maleimide and with maleimide (2.91 g) in water (30 ml) added. The results are as followes in Table V:

TABLE V

Maleimide Reactivity with $H_2S$ in Oil/Water Mixture

| Maleimide not added/<br>Maleimide added | Time<br>(min.) | $H_2S$<br>(ppm) |
| --- | --- | --- |
| no maleimide | 0 | 500 |
| | 18 | 500 |
| | 36 | 500 |
| maleimide added | 3 | 500 |
| | 9 | <0.001 |
| | 35 | <0.001 |

The above results demonstrated that the maleimide-$H_2S$ reaction was not affected by the presence of crude oil.

EXAMPLE 6

This experiment was conducted to demonstrate the reactivity of maleimide with mercaptans. Maleimide (5 g) was dissolved in water (200 ml) and NaOH (0.1N) and excess thioglycolic acid (mercaptoacetic acid) was added. The solution was allowed to sit at room temperature for a few days and then it was extracted with chloroform, ether and hexane to yield a white crystalline product. NMR analysis identified the crystals as addition product.

EXAMPLE 7

The same experiment was conducted as in Example 6, only thioacetic acid was used as the mercaptan. Once again, NMR analysis identified the crystals as addition product.

We claim:

1. A process for scavenging hydrogen sulfide and mercaptans from materials the process comprising contacting a material containing hydrogen sulfide and mercaptans with maleimides.

2. A process for scavenging hydrogen sulfide and mercaptans from fluids the process comprising contacting a fluid containing hydrogen sulfide and mercaptans with maleimides.

3. The process of claim 2 wherein the maleimide is the compound maleimide.

4. The process of claim 2 wherein the mercaptan is one having the following formula

R-SH wherein R is a hydrocarbon radical having from 1 to 40 carbon atoms.

5. The process of claim 4 wherein R has from 1 to 20 carbon atoms.

6. The process of claim 5 wherein R has from 1 to 6 carbon atoms.

7. The process of claim 2 wherein the maleimide is a 3,4-carbon-substituted maleimide derivative having the following formula

wherein X and X' are each one of H, F, Cl, Br, I, —CH$_3$, —C$_2$H$_5$, —OH or —CN.

8. The process of claim 2 wherein the maleimide is an N-substituted maleimide derivative having the following formula:

N-R wherein R is one of hydrogen; a hydroxyl group, a halogen; an ether, an ester, a ketone or an aldehyde group; a cyanogen group; or a hydrocarbon group including a paraffin, olefin or aromatic group.

9. The process of claim 2 wherein the fluid is water.

10. The process of claim 2 wherein the fluid is an aqueous/organic mixture.

11. The process of claim 9 or 10 wherein the pH of the fluid is acidic.

12. The process of claim 9 or 10 wherein the mercaptan is one having the formula:

R-SH wherein R is a hydrocarbon group having from 1 to 40 carbon atoms.

13. The process of claim 12 wherein the mercaptan is mercaptoacetic acid.

14. The process of claim 12 wherein the mercaptan is thioacetic acid.

15. The process of claim 12 wherein R has from 1 to 20 carbon atoms.

16. The process of claim 15 wherein R has from 1 to 6 carbon atoms.

17. The process of claim 16 wherein the maleimide derivative is a 3,4-carbon-substituted maleimide having the following formula:

wherein X and X' are each one of H, F, Cl, Br, I, —CH$_3$, C$_2$H$_5$, —OH or CN.

18. The process of claim 17 wherein the maleimide derivative is an N-substituted maleimide represented by the following formula:

>N-R wherein R is one of hydrogen; a halogen; a hydroxyl group; an ether, an ester, a ketone or an aldehyde group; a cyanogen group; or a hydrocarbon group including a paraffin, olefin or aromatic group.

* * * * *